(12) United States Patent
Gebhardt et al.

(10) Patent No.: US 12,195,282 B2
(45) Date of Patent: Jan. 14, 2025

(54) DRIVE DEVICE FOR A CONVEYING CARRIAGE OF A DISTRIBUTING CONVEYOR

(71) Applicants: Gebhardt Foerdertechnik GmbH, Sinsheim (DE); Koerber Supply Chain GmbH, Bad Nauheim (DE)

(72) Inventors: Marco Gebhardt, Sinsheim (DE); Halit Demir, Sinsheim (DE)

(73) Assignees: Gebhardt Foerdertechnik GmbH, Sinsheim (DE); Koerber Supply Chain GmbH, Bad Nauheim (DE)

( * ) Notice: Subject to any disclaimer, the term of this patent is extended or adjusted under 35 U.S.C. 154(b) by 223 days.

(21) Appl. No.: 17/909,331

(22) PCT Filed: Mar. 4, 2021

(86) PCT No.: PCT/DE2021/200030
§ 371 (c)(1),
(2) Date: Sep. 2, 2022

(87) PCT Pub. No.: WO2021/175388
PCT Pub. Date: Sep. 10, 2021

(65) Prior Publication Data
US 2023/0082453 A1 Mar. 16, 2023

(30) Foreign Application Priority Data
Mar. 6, 2020 (DE) .................... 10 2020 202 924.5

(51) Int. Cl.
*B65G 23/16* (2006.01)
*B65G 17/34* (2006.01)
(Continued)

(52) U.S. Cl.
CPC ........... *B65G 23/16* (2013.01); *B65G 17/345* (2013.01); *B65G 23/44* (2013.01); *B65G 43/02* (2013.01);
(Continued)

(58) Field of Classification Search
CPC ...... B65G 23/16; B65G 17/345; B65G 23/44; B65G 43/02; B65G 43/06; B65G 45/08;
(Continued)

(56) References Cited

U.S. PATENT DOCUMENTS 2,868,356 A * 1/1959 Haaff .................. F16H 7/06
198/833
4,564,099 A * 1/1986 Uozumi ................ B66B 29/005
198/810.04
(Continued)

FOREIGN PATENT DOCUMENTS

CN  110525751 A  12/2019
DE  100 52 510 A1  11/2002
(Continued)

OTHER PUBLICATIONS

International Search Report for International Application No. PCT/DE2021/200030, mailing date Oct. 15, 2021, 4 pages.
(Continued)

*Primary Examiner* — Mark A Deuble
(74) *Attorney, Agent, or Firm* — Seed IP Law Group LLP (57) ABSTRACT

A drive device for a conveying carriage of a distributing conveyor, preferably, of a transverse-belt sorter, includes a drive source and a roller chain for transferring a drive force of the drive source to a drive means on which the conveying carriage can be attached. With regard to an improved service life of the roller chain and a simultaneous reduction of maintenance effort and the associated costs and system downtimes, the drive device includes a measuring and
(Continued)

control unit for monitoring and influencing, as necessary, at least one operating state of the roller chain.

15 Claims, 7 Drawing Sheets

(51) Int. Cl.
    *B65G 23/44*     (2006.01)
    *B65G 43/02*     (2006.01)
    *B65G 43/06*     (2006.01)
    *B65G 45/08*     (2006.01)
    *B65G 47/46*     (2006.01)
    *B65G 47/94*     (2006.01)

(52) U.S. Cl.
    CPC ............. *B65G 43/06* (2013.01); *B65G 45/08* (2013.01); *B65G 47/46* (2013.01); *B65G 47/945* (2013.01); *B65G 2203/0283* (2013.01)

(58) Field of Classification Search
    CPC ................. B65G 47/46; B65G 47/945; B65G 2203/0283; B65G 47/96
    See application file for complete search history.

(56) References Cited

U.S. PATENT DOCUMENTS

| | | | |
|---|---|---|---|
| 5,143,206 A * | 9/1992 | Hoover | B65G 43/02 198/810.04 |
| 5,624,162 A | 4/1997 | Guse et al. | |
| 6,907,985 B1 * | 6/2005 | Axmann | B65G 17/345 198/833 |
| 9,671,251 B2 | 6/2017 | Siraky et al. | |
| 10,822,174 B2 * | 11/2020 | Hinterholzer | B65G 23/16 |
| 2005/0187053 A1 | 8/2005 | Kim | |
| 2017/0006878 A1 | 1/2017 | Domenicucci et al. | |
| 2019/0009993 A1 | 1/2019 | Rousseau | |

FOREIGN PATENT DOCUMENTS

| | | |
|---|---|---|
| DE | 20 2009 013 852 U1 | 3/2010 |
| DE | 10 2009 048 352 A1 | 4/2011 |
| DE | 10 2011 016 322 A1 | 8/2012 |
| DE | 10 2017 211 308 A1 | 1/2019 |
| DE | 10 2019 116 534 B3 | 7/2020 |
| EP | 2 908 097 A1 | 8/2015 |
| FR | 1520249 A | 4/1968 |
| WO | 2008/024685 A2 | 2/2008 |
| WO | 2019/002048 A1 | 1/2019 |

OTHER PUBLICATIONS

International Preliminary Report on Patentability and Written Opinion for Application No. PCT/DE2021/200030, date of issuance Sep. 6, 2022, 8 pages.

* cited by examiner

DRIVE DEVICE FOR A CONVEYING CARRIAGE OF A DISTRIBUTING CONVEYOR

BACKGROUND

Technical Field

The disclosure relates to a drive device for a conveying carriage of a distributing conveyor, preferably, of a transverse-belt sorter, comprising a drive source and a roller chain for transferring a drive force of the drive source to a drive means on which the conveying carriage can be attached.

The disclosure further relates to a device for conveying and sorting piece goods, preferably, transverse-belt sorters, comprising at least one driven conveying carriage and a drive device for the conveying carriage, wherein the drive device has a drive source and a roller chain for transferring a drive force of the drive source to a drive means on which the conveying carriage can be attached.

Description of the Related Art

Sorting conveyors or distributing conveyors are piece goods sorting systems for "identifying piece goods arriving in a random order on the basis of predetermined distinguishing features and for distributing them to targets that are set according to the respective requirements" (see VDI Guideline 3619). Thereby, classification takes place, in particular, according to performance. Highest throughputs with more than 10,000 sorted goods per hour are achieved, for example, by so-called "transverse-belt sorters."

Figure 1:
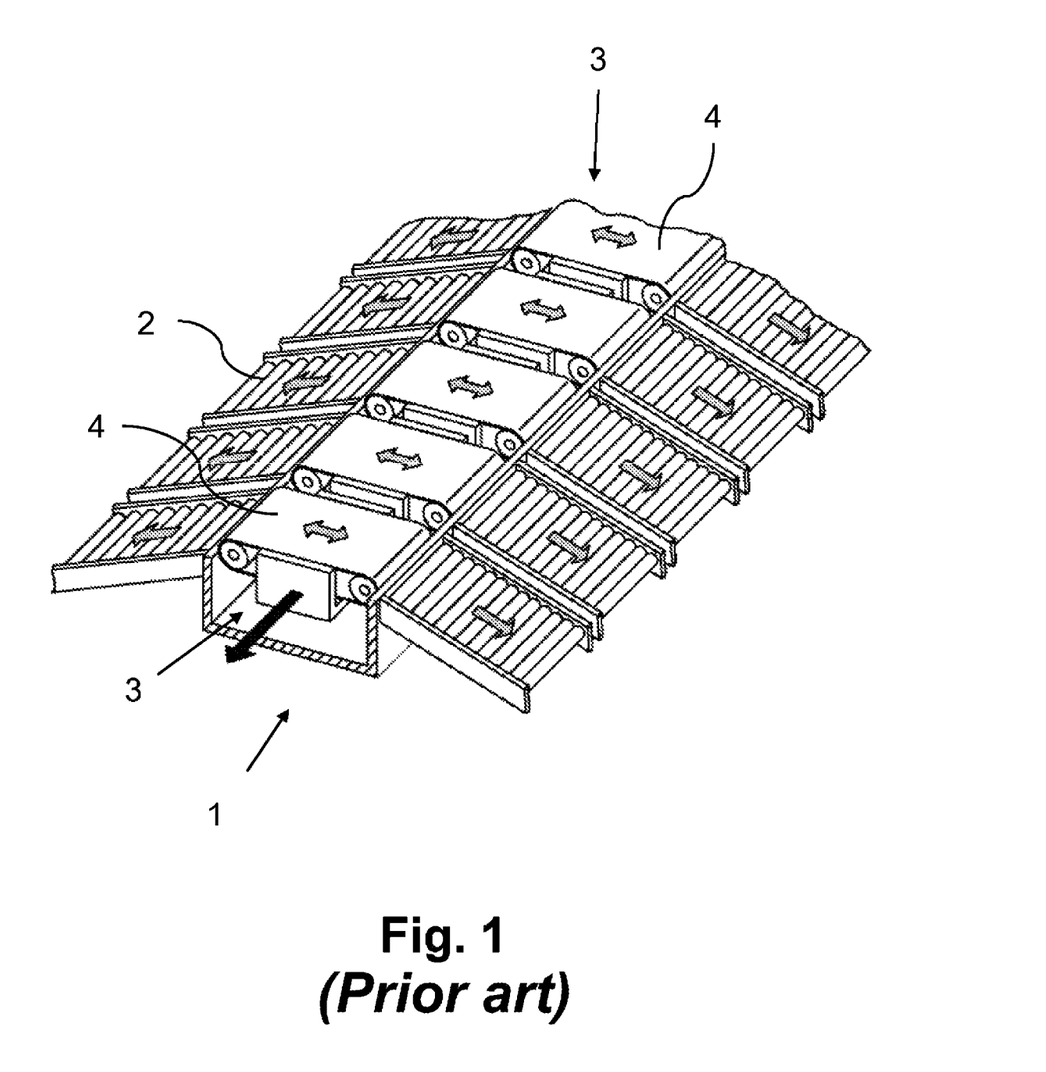
FIG. 1 is a schematic illustration of the general structure of a transverse-belt sorter according to the prior art.
Figure 2:
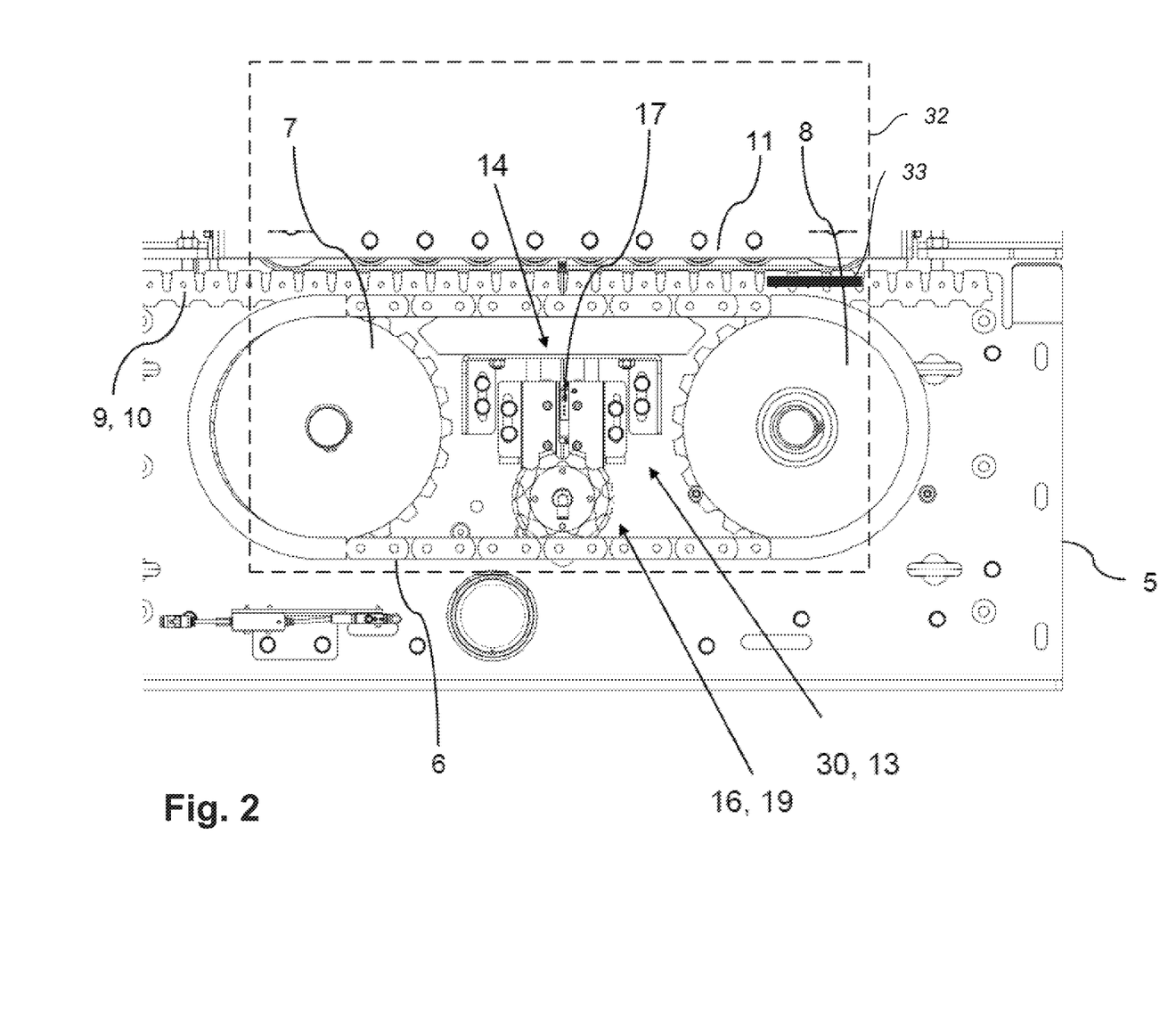
FIG. 2 is a schematic illustration of a drive device for a conveying carriage of a transverse-belt sorter according to an exemplary embodiment of the disclosure.
Figure 3:
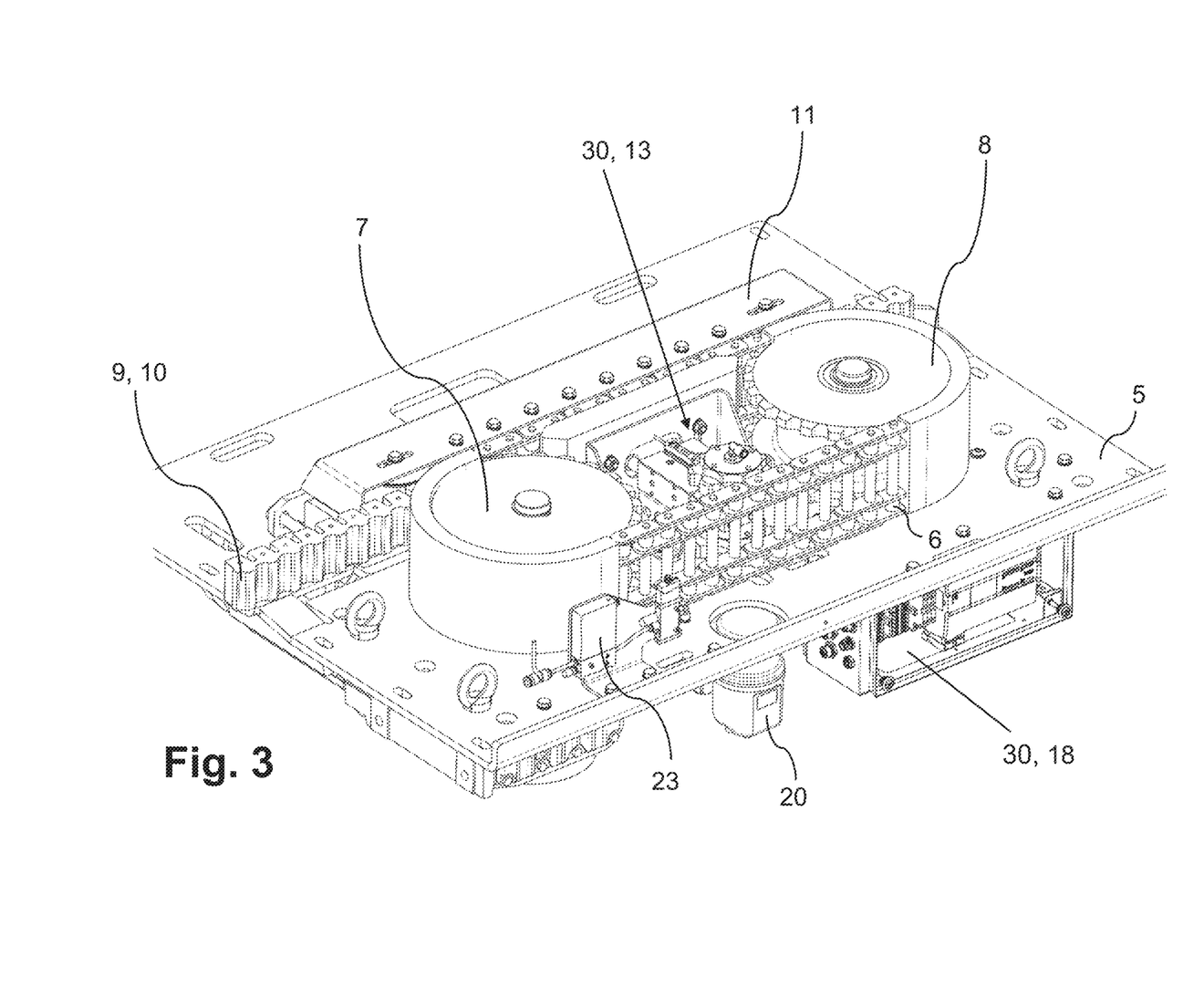
FIG. 3 is a schematic, perspective view of the device according to FIG. 2.

The usual basic structure of the specified sorter comprises, as illustrated in FIG. 1, a sorting line 1, wherein successive discharge stations 2 (end points) and feeding stations (not shown) are arranged along such sorting line 1. Conveying carriages 3, often also referred to as carriers, are successively guided and driven on sorting line 1. In the case of transverse-belt sorters, the conveying carriages 3 have belt conveyors 4 that can be driven transversely to the conveying direction for feeding and discharging the sorted material, as shown by way of example in FIG. 1.

Drive devices for distributing conveyors of the type discussed here are known from practice in various embodiments. Conventional drive devices for the conveying carriage of a transverse-belt sorter are usually formed as chain drive systems, in which the drive force of a drive source is transferred via a driven roller chain to a toothed rubber block chain. The roller chain, which is usually designed as a duplex roller chain with extended intermediate pins, thereby spans a drive sprocket and a deflection sprocket, wherein the deflection sprocket can be fixed in a displaceable manner via a screw device. In this way, the roller chain is tensioned both during start-up, for applying the required fundamental tension, and during maintenance cycles, for compensating for the elongation of the roller chain.

One of the known problems of this drive device is, in particular, the increased wear of the expensive roller chain, which is caused, in particular, by excessive tensioning of the chain. The reason for this is that the tensioning force of the roller chain directly depends upon the force of the adjusting person. In particular, if the maintenance personnel of an end customer has to make this adjustment, overtensioning of the roller chain often occurs. Another reason for the increased wear of the roller chain is too little lubrication, which is caused, in particular, by non-compliance with the maintenance requirements and incorrect oil/grease dosing.

As is known, relatively short maintenance intervals (for example, every three months) are predetermined for the drive devices of the type discussed here, wherein the maintenance includes re-tensioning and re-lubricating the roller chain. Thereby, prior to a maintenance intervention, it is neither measurable nor clearly visible whether re-tensioning or re-lubrication is actually necessary, since this depends in particular upon the system utilization at the respective operator and the forces that occur differently as a result. This causes high system downtimes and also high costs for maintenance personnel.

BRIEF SUMMARY

Therefore, the present disclosure is directed to a drive device for a conveying carriage of a distributing conveyor, along with a device for conveying and sorting piece goods of the type mentioned above, in such a way that the service life of the roller chain is improved and, at the same time, the maintenance effort and the associated costs and system downtimes are reduced.

Disclosed herein is drive device for a conveying carriage of a distributing conveyor, wherein the drive device is characterized by a measuring and control unit for monitoring and influencing, as necessary, at least one operating state of the roller chain.

Also disclosed herein is a device for conveying and sorting piece goods that includes a drive device, wherein the drive device has a measuring and control unit for monitoring and influencing, as necessary, at least one operating state of the roller chain.

In a manner according to the present disclosure, it was initially recognized that the service life of the roller chain depends quite significantly upon its wear and the associated elongation of the roller chain. Because the drive forces vary over time during operation, a general statement regarding the service life of this roller chain is not possible. Until now, a statement can only be made as to whether the roller chain must be replaced by manual measurement and sighting, for example, by the operator of the installation during each maintenance interval. The present disclosure accordingly relates to the integration of a measuring and control unit into the drive device, which monitors at least one operating state of the roller chain and influences it as necessary. According to embodiments of the disclosure, the measuring and control unit can be formed as an automatic, pneumatic tensioning, measuring, and lubricating system.

Advantageously, the at least one monitored operating state of the roller chain can be the chain length or chain elongation of the roller chain. As already mentioned above, this is one of the main factors that can negatively influence the service life of the roller chain. Additionally or alternatively, the monitoring could relate to the lubrication state of the roller chain.

According to an advantageous embodiment, the measuring and control unit can have a control component to which measurement results with respect to the chain length or chain elongation of the roller chain are transmitted. Thereby, the control component can be configured in such a way that it derives a wear state and/or a lubrication state of the roller chain from the measurement results, using predeterminable algorithms. In addition, a wear state of the associated sprockets over which the roller chain runs, a deformation of the axis of the associated sprockets of the roller chain, and/or a breakage or tearing of the roller chain can also be derived from the measurement results.

According to a further advantageous embodiment, the control component can be configured to determine an adapted lubrication dosage and/or an adapted lubricating interval as a function of the derived lubrication state of the roller chain. Accordingly, incorrect dosages would be effectively avoided. In particular, the algorithms for deriving a lubrication state of the roller chain can be designed in such a way that excessive lubrication is also prevented by the adapted lubrication dosage determined or the adapted lubrication interval determined. This is important, since, if there is too much oil/grease in the system, it can happen that lubricant not only reaches the roller chain, but is also flung onto other components and damages them or impairs their function.

With regard to reliable and accurate monitoring of the length of the roller chain, an indirect measurement of the chain elongation can be provided. For this purpose, the measuring and control unit can, advantageously, have a chain tensioning device that comprises a working cylinder, the piston rod of which is configured to press against the roller chain. Thereby, a constant working force can be applied to the piston of the working cylinder, in order to thus generate a constant chain tension of the roller chain. The chain elongation that occurs is continuously compensated for by the constant tensioning force.

The positioning of the piston rod within the cylinder sleeve of the working cylinder can, advantageously, be measured continuously. The chain elongation of the roller chain can be calculated directly from such measurement results, wherein the further the piston exits the cylinder sleeve, the greater the elongation. Within the framework of a specific embodiment, it can in this respect be provided that, for example, a position transmitter be assigned to the working cylinder and be configured to determine the position of the cylinder piston and to transmit it to a control component of the measuring and control unit.

As a function of the specific operating situation, the working cylinder can in principle be operated with different working media. In particular, the working cylinder can be designed, for example, as a pneumatic cylinder, as a hydraulic cylinder, or as an electric cylinder.

In order to produce a secure, low-wear contact between the piston rod of the working cylinder and the roller chain, it can, advantageously, be provided that a tensioning pinion be arranged on the piston rod of the working cylinder and interact with the roller chain. Accordingly, the piston rod does not press directly on the roller chain; rather, the constant force of the working cylinder applied to tension the roller chain is transferred indirectly to the roller chain via the tensioning pinion firmly connected to the piston rod.

With regard to a particularly effective prevention of incorrect lubricants of the roller chain, in terms of both the dosing and the interval of lubrication, the drive device can furthermore comprise a lubricating device for the controlled delivery of lubricant to the roller chain. Thereby, the lubricating intervals and the lubricating amounts can be automatically determined, for example, by a decentralized control component of the measuring and control unit on the basis of a lubrication state of the roller chain derived from measurement results with respect to the chain length or chain elongation of the roller chain.

In terms of design, the lubricating device can, advantageously, interact with or be coupled to the tensioning pinion. According to a preferred embodiment, the lubricating device accordingly comprises, for example, a chain lubricating pinion with integrated lubricant channels mounted on the tensioning pinion. The teeth of the chain lubricating pinion can be made of a foam material suitable for storing and delivering lubricants, e.g., PU foam, or special elements made of such a foam material could be arranged on the chain teeth.

With regard to a particularly targeted and dosed delivery of lubricant to the roller chain, the tensioning pinion and the chain lubricating pinion are, advantageously, positioned relative to one another in such a way that the teeth of the chain lubricating pinion are each positioned between two teeth of the tensioning pinion. As a result of such an embodiment, the valleys form in each case defined lubricating points between the teeth of the tensioning pinion.

Typically, the roller chain is designed such that it forms a chain circuit and thereby spans at least one drive sprocket, along with one or more deflection sprockets. In such an embodiment, it is advantageous if the lubricating device is positioned in the interior of the chain circuit. In this way, it is ensured that the centrifugal forces occurring during the operation of the drive device due to the rotation of the tensioning pinion and the chain lubricating pinion coupled thereto do not work against a targeted delivery of the lubricant.

According to an advantageous embodiment, the lubricating device comprises a lubricant conveying device that is configured to receive control commands from a control component of the measuring and control unit and to deliver lubricant according to the received control commands. In particular, the lubricating intervals and the lubricating amounts, which are determined, for example, by a decentralized control component of the measuring and control unit on the basis of a lubrication state of the roller chain derived from measurement results with respect to the chain length or chain elongation of the roller chain, can be automatically transmitted to the lubricant conveying device. Conversely, the lubricant conveying device can also regularly transmit the supply of lubricant present to the decentralized control component. If oil is used as lubricant, the lubricant conveying device could, for example, be designed as an oil pump.

According to a further advantageous embodiment, the drive device can comprise a visual display device for displaying at least one operating state of the roller chain. The display device can, for example, be designed as an LED panel, which is visibly attached to a housing of the drive device and displays different operating states of the roller chain with the aid of different colors and/or flashing states.

According to an advantageous embodiment, the roller chain is formed as a duplex roller chain, by which a particularly effective transfer of the drive force to the respective drive means of the distributing conveyor on which the conveying carriages are attached, e.g., a rubber block chain, can be achieved. In the case of a duplex roller chain, the chain tensioning device can be adapted to the effect that two, corresponding tensioning pinions are provided, each of which engages in the chain tabs on both sides of the intermediate pins.

BRIEF DESCRIPTION OF THE DRAWINGS

Various options for advantageously designing and developing the teaching of the present disclosure now exist. For this purpose, with the aid of the drawings, reference is made, on the one hand, to the dependent patent claims and, on the other, to the following explanation of preferred exemplary embodiments of the disclosure. Generally preferred designs and developments of the teaching are also explained, in conjunction with the explanation of the preferred exemplary embodiments of the disclosure, with reference to the drawings. The drawings show the following:

In the figures, unless otherwise indicated, the same reference signs denote the same components or parts.

DETAILED DESCRIPTION

FIGS. 2-5 schematically show, in different illustrations, a drive device for a conveying carriage of a transverse-belt sorter according to an exemplary embodiment of the disclosure. The drive device is mounted on a mounting base plate 5 and comprises a roller chain 6, which spans a drive sprocket 7 and a deflection sprocket 8. The drive sprocket 7 is driven by a drive source (not shown) that is preferably arranged on the rear side of the mounting base plate 5. By means of the roller chain 6, the drive force of the drive source is transferred to a drive means 9 in the form of a rubber block chain 10. For this purpose, on the side, facing away from the roller chain 6, of the rubber block chain 10, a counter-pressure unit 11 is arranged, which presses the rubber block chain 10 against the roller chain 6. The conveying carriages of the transverse-belt sorter (not shown) can be attached to the rubber block chain 10 via a connecting element, for the purpose of drive by means of the drive device.

According to the disclosure, the drive device comprises a measuring and control unit for monitoring and influencing, as necessary, at least one operating state of the roller chain 6. A component of the measuring and control unit forms a chain tensioning device 13 for tensioning the roller chain 6. According to exemplary embodiments of the disclosure, the chain tensioning device 13 is formed simultaneously for measuring a chain elongation of the roller chain 6 and/or for lubricating the roller chain 6 in a manner optimized with regard to dosing and interval.

In the prior art, a roller chain elongation occurring during operation is typically compensated for by a readjustment of the deflection chain wheel 8 performed as part of maintenance. In contrast to this, according to an exemplary embodiment of the disclosure, the roller chain 6 is tensioned by means of the independent chain tensioning device 13 with a constant force. The constant tensioning force continuously compensates for any elongation of the roller chain that arises.

As shown in FIGS. 2-5, the chain tensioning device 13 comprises a pneumatic cylinder 14 having a piston guided in a guide cylinder 15, to which a defined, constant air pressure is applied. The constant air pressure can be produced, for example, via a proportional pressure-control valve and a precision pressure-control valve. The pressure-control and switching valves required to operate the pneumatic cylinder 14 are shown schematically in FIG. 3 with reference sign 23.

Two tensioning pinions 16 are firmly connected to the piston rod of the pneumatic cylinder 14. Specifically, the tensioning pinions 16 are attached on opposite sides of a mounting block 22, which is mounted on the piston rod so as to be seated in the piston rod, as shown in particular in FIG. 4. The tensioning pinions 16 are pressed with a constant force against the return strand of the roller chain 6 via the piston rod of the pneumatic cylinder 14, and thus cause a constant tension of the roller chain 6 independent of the chain elongation. Thereby, the tensioning pinions 16 are attached to the piston rod of the pneumatic cylinder 14 at a distance from each other that is adapted to the geometry of the roller chain 6 in such a way that they each engage in the chain tabs on both sides of the intermediate pins, as shown in particular in FIG. 5.

Figure 4:
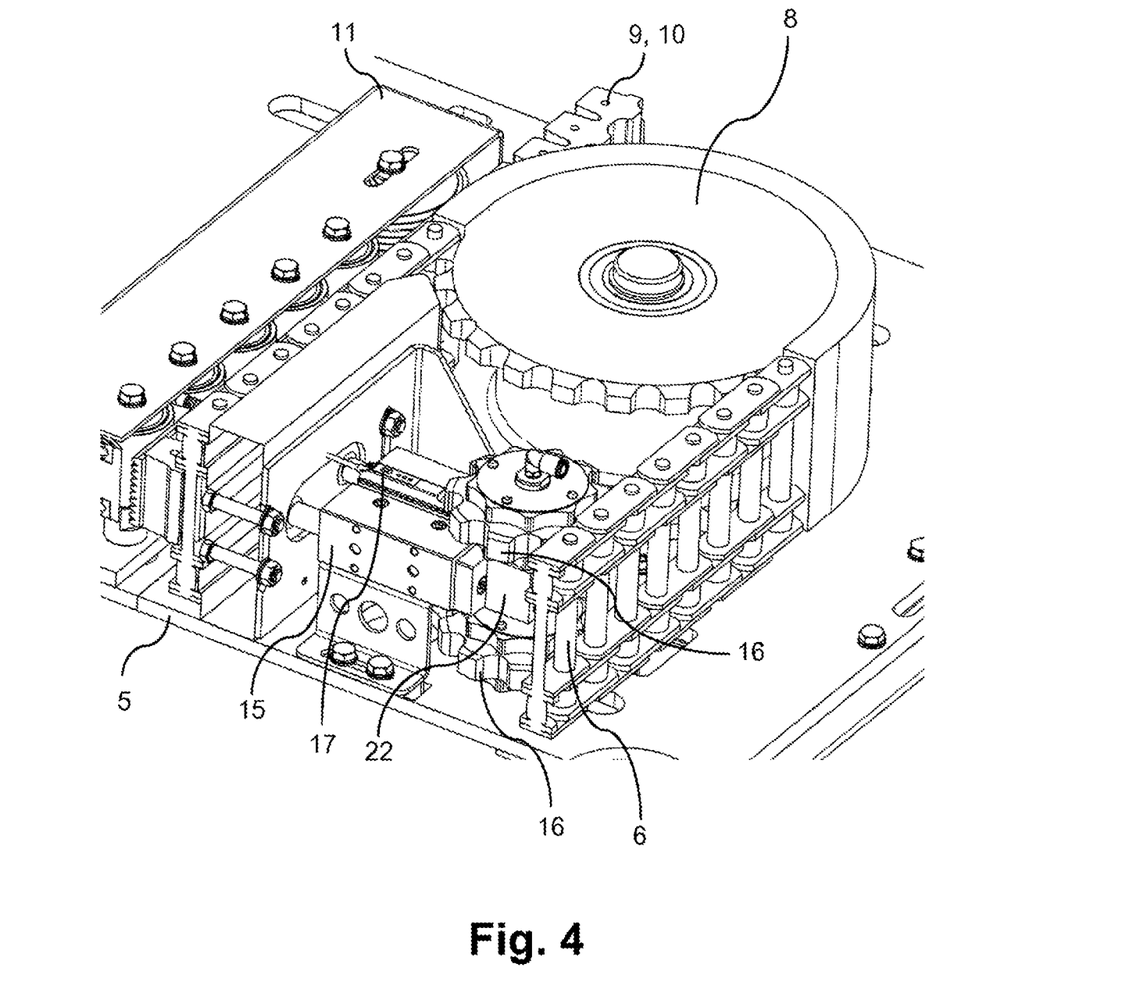
FIG. 4 is a schematic, perspective view of an enlarged section of the drive device according to FIGS. 2 and 3.
Figure 5:
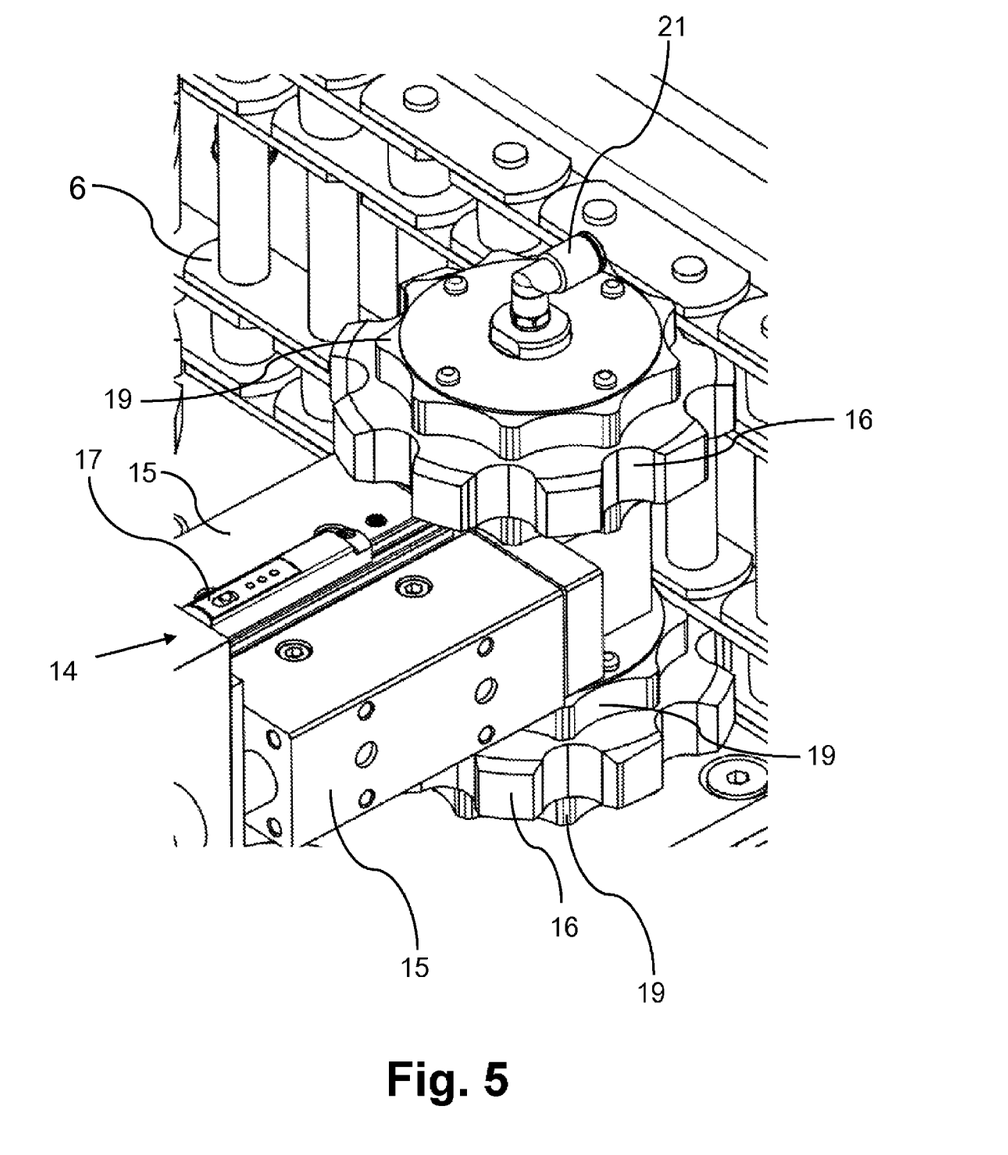
FIG. 5 is a schematic, perspective view of a chain tensioning device of the drive device according to FIGS. 2 through 4.

As shown in particular in FIGS. 4 and 5, the pneumatic cylinder 14 is equipped with a position transmitter 17. The position transmitter 17 measures the piston position with high accuracy, preferably with an accuracy of up to ±0.02 mm, depending upon the embodiment, and electronically communicates the measured piston position to a decentralized control component 18. The control component 18 can, for example, be a PLC controller.

On the basis of the measured values of the piston position, a chain elongation of the roller chain 6 over time can be calculated with simple mathematical calculations. As is known to the person skilled in the art, statements regarding the wear of the roller chain 6 and/or the associated sprockets (i.e., the drive sprocket 7 and the deflection sprocket 8), and also regarding the lubrication state, in particular, with regard to any lack of lubrication, can be made via a characteristic of the chain elongation that is thus determined. Such characteristics have in part been examined and published by various chain suppliers. At the same time, however, embodiments of the drive device according to the disclosure also make it possible to carry out corresponding examinations on the basis of collected measurement data, in order to be able, in future, to make qualitatively and/or quantitatively better statements regarding the chain wear and/or the lubrication state of the roller chain 6. According to a further embodiment, the collected measurement data can be examined comparatively with further data collected over the same time axis from other components of the distributing conveyor/sorter, such as from the electric motor, and further useful findings, in particular, with respect to predictive maintenance, can be obtained therefrom.

Since, as described above, the elongation of the roller chain 6 is automatically compensated for by the chain tensioning device 13, maintenance intervention up to a defined, predeterminable elongation limit is, advantageously, not necessary. If the elongation limit is almost reached, it can be provided that the control component 18 notify or display this state to the operator in an informative or visual manner. Accordingly, the operator can carry out a targeted check of the roller chain 6, which is also in fact initiated by the actual state derived. If necessary, the operator can replace the roller chain 6. In terms of control technology, the state of "almost reaching" the elongation limit of the roller chain 6 can be predetermined via a defined measured value from the position transmitter 17 with respect to the piston position of the pneumatic cylinder 14.

According to a preferred embodiment, the defined lubrication of the roller chain 6 is realized as follows: As shown in particular in FIG. 5, lubricating pinions 19 with integrated oil channels are attached on both sides of the tensioning pinion 16. The chain lubricating pinions 19 can be formed as elements made of (open-cell) PU foam that, due to their special geometry and position relative to the respective tensioning pinion 16, push the lubricating oil only into defined regions of the roller chain 6.

According to the embodiment shown, the lubricant passes into the foam material through the hollow axis of the chain lubricating pinion 19 and corresponding bores via the oil port 21 that can be connected to an oil pump 20. The PU-foam material used stores the lubricant and delivers it in fine dosing amounts.

Figure 6:
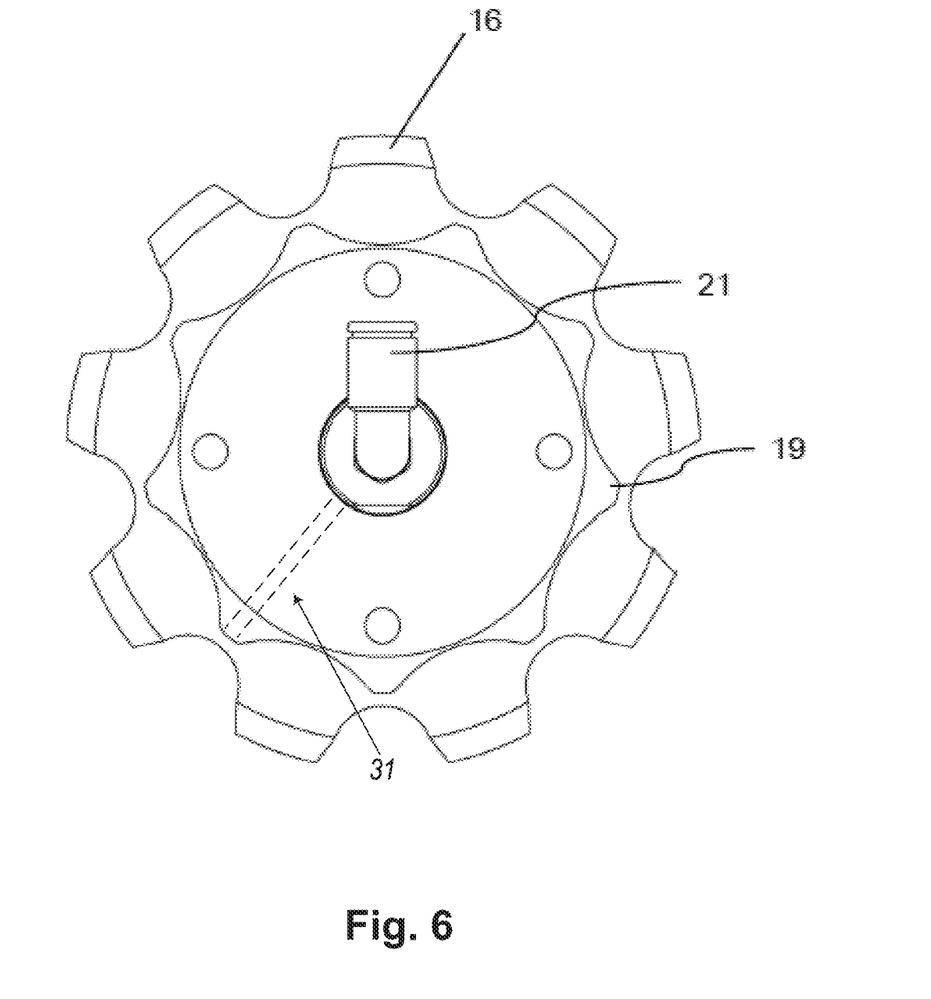
FIG. 6 is a schematic top view of a tensioning pinion of the chain tensioning device according to FIG. 5.

FIG. 6 shows a schematic top view of a tensioning pinion 16 of the chain tensioning device 13 according to FIGS. 2-5 with a corresponding chain lubricating pinion 19. Thereby, contact between the chain tab and PU foam takes place only in the region of the chain links of the roller chain 6, via the teeth of the chain lubrication pinion 19 positioned precisely in the valleys of the tensioning pinion 16. Due to the contact and an associated slight contraction of the PU foam, the lubricating oil supplied via the hollow axis will pass between the chain tabs only exactly where it is actually required. Spot lubrication takes place on the surface of the chain tabs. Starting from the points at which the lubricating oil is applied to the roller chain 6 via the teeth of the chain lubricating pinion 19, the oil is subsequently drawn via capillary action into the spaces between the chain pins and sleeves, as well as between the chain sleeves and the roller of the roller chain 16. So that the centrifugal forces do not counteract this, the lubrication preferably takes place from the interior of the chain circuit of the roller chain 6.

The preceding description according to FIGS. 2-5 refers to a roller chain 6 that is designed as a duplex roller chain. It goes without saying that, in the case of a simple roller chain, the chain tensioning device 13 need have only a single tensioning pinion 16. The chain lubricating pinion 19 attached on both sides of the tensioning pinion 16 could likewise be used for lubrication, as described above.

Figure 7:
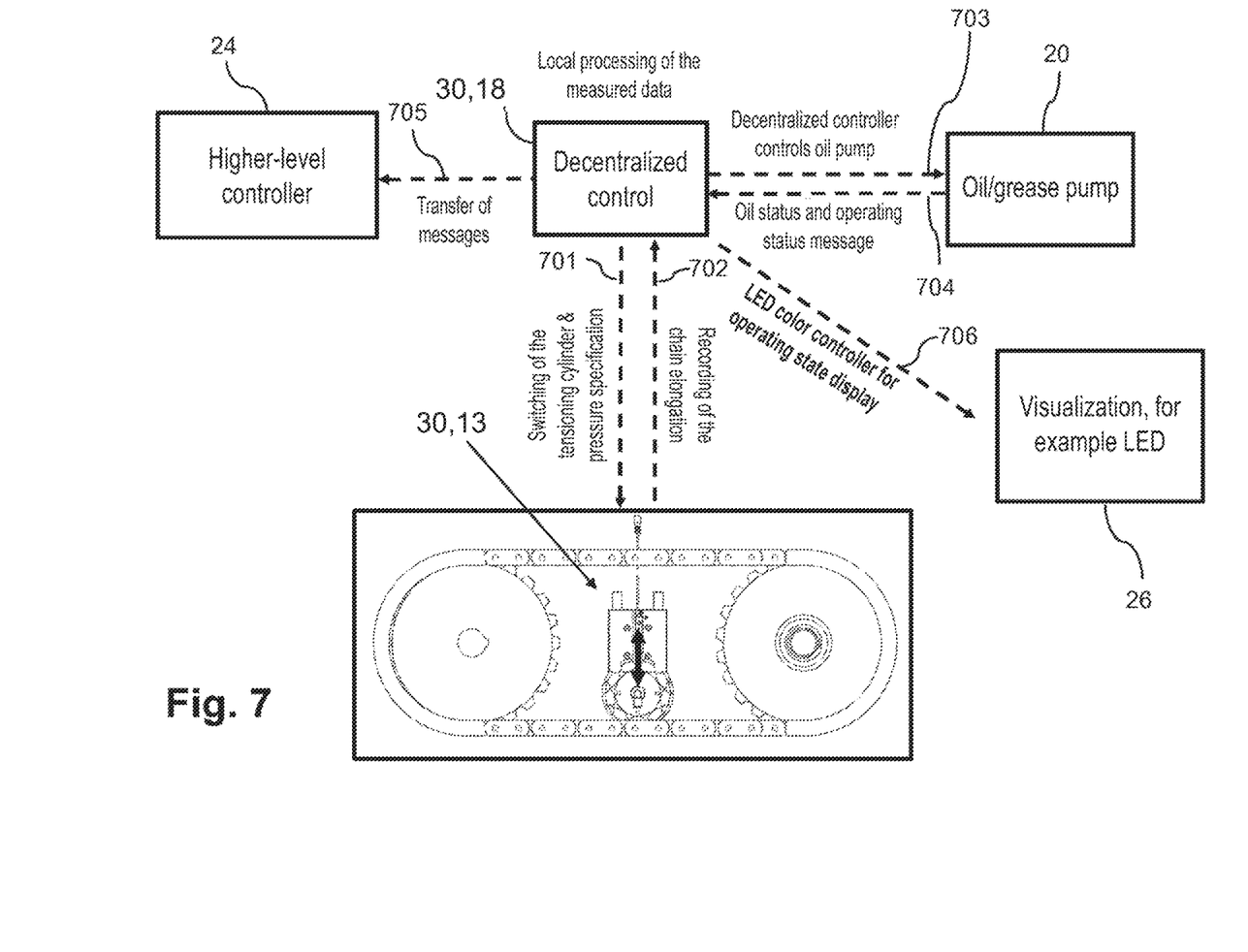
FIG. 7 is a schematic illustration of the operation of a measuring and control unit of a drive device according to an exemplary embodiment of the disclosure.

As shown in the overview of the control in FIG. 7, in the event that a lack of lubrication is evaluated, the control component 18 (preferably designed as a PLC controller) communicates with the oil pump 20 and independently adjusts the lubrication intervals and lubrication dosages accordingly. For its part, the oil pump 20 in turn reports the fill-level to the decentralized PLC controller 18, so that such information can also be evaluated and accordingly reported to a higher-level controller. In this connection, rules for the operation of the drive device can also be set up, e.g., that, above a predetermined threshold value, the system can no longer start without a supply of lubricating oil.

In the event that the roller chain breaks, the pneumatic cylinder 14 moves from the roller chain 6 into its final position, due to the lack of counter-pressure or the lack of counter-tension. Such a position of the piston at the stop is transferred by the position transmitter 17 to the decentralized control component 18 in the shortest possible time. In response to receiving corresponding information, it can be provided that the control component 18 automatically shut down the drive device and relay to the operator a corresponding message to a higher-level controller. This is an advantage of the drive device according to the disclosure compared to the solutions existing in the prior art, which, so far, do not offer a rapid possibility of clearly detecting a chain breakage during the running time of the system, in order to be able to react directly with an automatically-triggered, emergency stop of the system.

As described above, the roller chain 6 is tensioned by means of the chain tensioning device 13 with a defined, constant force, by which the chain elongation that occurs is continuously compensated for. As shown in FIG. 7 at 701, the corresponding switching signals for controlling the tensioning cylinder (for example, the pneumatic cylinder 14 shown in FIGS. 2-5) is transmitted from the control component 18 to the corresponding pressure-control and switching valves 23 of the chain tensioning device 13 by means of suitable pressure specifications.

At the same time, as described above, the elongation of the roller chain 6 is measured by determining the position of the cylinder piston of the tensioning cylinder. As shown in 702, the data thus determined are communicated to the control component 18 for further processing.

The data of the chain elongation are analyzed by the control component 18 over a longer time, relative to the running time of the system, and, using specific algorithms, conclusions regarding chain and sprocket wear, as well as regarding current lubrication, along with a crack of the roller chain 6, are formed. In addition, the data of the chain elongation can be compared to data from other components of the sorter.

As described above, via a lubrication system, special PU-foam elements on the tensioning pinion 16 are supplied with lubricating oil via an oil pump 20, which lubricating oil lubricates the roller chain 6 at defined locations. Thereby, the lubrication intervals and the lubrication amounts are automatically determined by the control component 18 on the basis of the conclusions determined regarding the lubrication state of the roller chain 6 and are communicated to the oil pump 703. The oil pump 20, for its part, is configured to periodically transmit 704 the present supply of lubricant to the decentralized control component 18.

All processed information from the decentralized control component 18 may be forwarded to a higher-level controller 24, and thus to the operator of the system, as with 705 in FIG. 7.

As shown in 706, defined operating states can also be displayed with the aid of different colors and flashing states via an LED panel 26, which is attached to the mounting base plate 5 or a housing of the drive unit.

With regard to other advantageous embodiments of the device according to the present disclosure, to avoid repetition, reference is made to the general part of the description and also to the accompanying claims.

Finally, it is expressly pointed out that the above-described exemplary embodiments of the device according to the disclosure serve only to explain the claimed teaching, but do not restrict it to the exemplary embodiments.

LIST OF REFERENCE SIGNS

1 Sorting line
2 Feeding station (end point)
3 Conveying carriage
4 Belt conveyor
5 Mounting base plate
6 Roller chain
7 Drive sprocket
8 Deflection sprocket
9 Drive means
10 Rubber block chain
11 Counter-pressure unit
13 Chain tensioning device
14 Pneumatic cylinder
15 Guide cylinder 16 Tensioning pinion
17 Position transmitter
18 Control component
19 Chain lubricating pinion
20 Oil pump
21 Oil port
22 Mounting block
23 Pressure-regulating and switching valves
24 Higher-level control
26 LED panel
30 Measuring and control unit
31 Integrated lubricant channel
32 Conveying carriage
33 Connecting element The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A drive device for a conveying carriage of a distributing conveyor, comprising:
   a drive source,
   a roller chain for transferring a drive force of the drive source to a drive to which the conveying carriage can be attached,
   a measuring and control unit for monitoring and influencing at least one operating state of the roller chain wherein the measuring and control unit comprises a working cylinder having a piston rod configured to press against the roller chain, wherein a constant working force can be applied to a piston of the working cylinder in order to generate a constant tension of the roller chain, wherein a tensioning pinion is arranged on the piston rod of the working cylinder and interacts with the roller chain, and
   a lubricating device for a controlled delivery of lubricant to the roller chain, wherein the lubricating device comprises a chain lubricating pinion, with integrated lubricant channels, mounted on the tensioning pinion, wherein elements made of a material suitable for storing and delivering lubricants are provided on teeth of the chain lubricating pinion.

2. The drive device according to claim 1, wherein the at least one operating state of the roller chain comprises a chain length or chain elongation of the roller chain.

3. The drive device according to claim 2, wherein the measuring and control unit has a control component that is configured to receive measurement results with respect to the chain length or chain elongation of the roller chain, and, from the measurement results, to derive, using predeterminable algorithms,
   a wear state and/or a lubrication state of the roller chain,
   a wear state of associated sprockets of the roller chain,
   a deformation of an axis of the associated sprockets of the roller chain, and/or
   a breakage or tearing of the roller chain.

4. The drive device according to claim 3, wherein the control component is configured to determine an adapted lubrication dosage and/or an adapted lubricating interval as a function of a derived lubrication state of the roller chain.

5. The drive device according to claim 1, wherein the at least one operating state of the roller chain comprises a lubrication state of the roller chain.

6. The drive device according to claim 1, wherein a position transmitter is assigned to the working cylinder and is configured to determine a position of the piston and to transmit the position to a control component of the measuring and control unit.

7. The drive device according to claim 6, wherein the control component is configured to switch off the drive device when a signal indicating a position of the piston of the working cylinder in an extended end position is received from the position transmitter.

8. The drive device according to claim 1, wherein the tensioning pinion and the chain lubricating pinion are positioned relative to one another in such a way that the teeth of the chain lubricating pinion are each positioned between two teeth of the tensioning pinion.

9. The drive device according to claim 1, wherein the roller chain forms a chain circuit and spans at least one drive sprocket along with one or more deflection sprockets, wherein the lubricating device is positioned in an interior of the chain circuit.

10. The drive device according to claim 1, wherein the lubricating device comprises a lubricant conveying device configured to receive control commands from a control component of the measuring and control unit and to deliver lubricant according to the control commands.

11. The drive device according to claim 1, further comprising a visual display device for displaying at least one operating state of the roller chain.

12. The drive device according to claim 1, wherein the roller chain is a duplex roller chain.

13. The drive device according to claim 1, wherein the drive comprises a rubber block chain.

14. A drive system for conveying and sorting piece goods, comprising:
   at least one conveying carriage, and
   a drive device for the at least one conveying carriage, wherein the drive device has a drive source and a roller chain for transferring a drive force of the drive source to a drive to which the conveying carriage can be attached,
   wherein the drive device further has a measuring and control unit for monitoring and influencing at least one operating state of the roller chain, wherein the measuring and control unit comprises a working cylinder having a piston rod configured to press against the roller chain, wherein a constant working force can be applied to a piston of the working cylinder in order to generate a constant tension of the roller chain, wherein a tensioning pinion is arranged on the piston rod of the working cylinder and interacts with the roller chain, and
   wherein the drive device further has a lubricating device for a controlled delivery of lubricant to the roller chain, wherein the lubricating device comprises a chain lubricating pinion, with integrated lubricant channels, mounted on the tensioning pinion, wherein elements made of a material suitable for storing and delivering lubricants are provided on teeth of the chain lubricating pinion.

15. The drive system according to claim 14, wherein the drive comprises a rubber block chain.

* * * * *